United States Patent Office

2,905,673
Patented Sept. 22, 1959

2,905,673

METHOD FOR PREPARING 1-METHYL-PIPERAZINE

Philip H. Moss, Austin, Tex., assignor to Jefferson Chemical Company, Inc., Houston, Tex., a corporation of Delaware No Drawing. Application December 24, 1957
Serial No. 704,887

5 Claims. (Cl. 260—268)

This invention relates to the production of a substituted piperazine and, in particular, relates to an improved method for producing 1-methylpiperazine from piperazine and methyl chloride.

Methyl substituted piperazine, i.e. 1-methylpiperazine, has been prepared by numerous methods. One well-known method involves the condensation of a diethanolamine with a primary methyl amine. While this method is reasonably effective, it has serious drawbacks in that it must be conducted in the presence of a catalyst, such as Raney nickel, and requires high reaction temperatures. Another method for preparing 1-methylpiperazine is based on the discovery that polymethylene polymerization products obtained by the reaction of piperazine and formaldehyde may be decomposed to 1-methylpiperazine by hydrogenation. Still other methods of preparation have been employed including the blocking of one of the nitrogen atoms on piperazine followed by alkylation of the other nitrogen atom and restoration of the blocked nitrogen atom, and the reaction starting with an alkylamine and ethylene oxide both referred to by Morren, U.S. 2,639,284.

While the foregoing processes are operative, these syntheses present numerous difficulties. Many of the foregoing methods require relatively unusual and expensive reactants, critical operating conditions and produce substantial amounts of undesirable by-products. In addition, the yield of 1-methylpiperazine obtained from these processes has generally been quite low, often substantially below 50%.

Surprisingly, it has now been discovered that 1-methylpiperazine may be easily and economically prepared in high yield by reacting piperazine with methyl chloride by a condensation reaction with the liberation of HCl. This process is effective in the absence of catalyst and produces yields of 1-methylpiperazine in the order of 90% by weight of theoretical based on the limiting reactant.

According to this invention, piperazine, preferably in a substantial molar excess, is directly reacted with methyl chloride. The molar ratio of piperazine to methyl chloride should be in the range of 1.5:1 to 6:1, preferably in the range of 2:1 to 4:1.

The reaction may be conducted in a closed reaction zone or autoclave at a moderately elevated pressure and a moderately elevated temperature. A temperature in the range of 95–120° C. is preferred although temperatures from about 80 to 200° C. may be employed. The pressure is generally about 20–80 pounds per square inch gauge and may be that resulting from the methyl chloride gas in the closed reaction zone at the temperature employed.

The reaction between piperazine and methyl chloride is facilitated when conducted in the presence of a liquid medium or carrier serving to produce a more homogeneous mixture of the reactants, particularly when the reaction zone is agitated as by a rocking autoclave. A suitable medium for this process is a solvent which is a good solvent for piperazine, will dissolve an appreciable amount of methyl chloride, and is inert under reaction conditions. For convenience in subsequent separation, the solvent preferably has a boiling point which is either lower or higher than the boiling points of the reaction products. Solvents which may be employed include methanol, ethanol, ethylene glycol, diethylene glycol and water. The piperazine is conveniently first dissolved in the solvent, the solution charged to the reaction zone, the desired quantity of methyl chloride then introduced, and the reaction zone heated while the contents are preferably agitated.

Under the foregoing conditions, the reaction between piperazine and the lesser molar amount of methyl chloride is substantially complete (substantially complete consumption of the methyl chloride) in a short reaction time of about 1–3 hours with yields of 1-methylpiperazine in the order of 90 mole percent based on the methyl chloride or about 95 mole percent based on the piperazine reacted.

This methylation reaction is unexpectedly specific to the production of 1-methylpiperazine. A relatively small amount of 1,4-dimethylpiperazine of the order of 10 mole percent based on the methyl chloride is also produced. An economical and convenient method of isolation and recovery of the reaction products involves neutralizing the HCl in the reaction mix with an aqueous alkaline solution, such as aqueous caustic soda, which may be added with the initial reactants, during the reaction or after completion thereof, followed by fractional distillation of the neutralized reaction mix. In case a low boiling solvent such as methanol is used, this is first removed overhead, and then a water azeotrope of the 1,4-dimethylpiperazine is removed together with most of the excess water below 101° C. The next cut taken between 101° C. and about 145° C. contains the 1-methylpiperazine together with a minor amount of piperazine and any remaining water (very small amount), and is substantially free from 1,4-dimethylpiperazine. Redistillation of this cut enables the 1-methylpiperazine to be recovered in high purity, and the remaining piperazine together with the residual piperazine from the first distillation are separated for reuse in the process.

Conveniently, a solvent which is higher boiling than 1-methylpiperazine, such as ethylene glycol or diethylene glycol, may be used for the reaction or added for the fractional distillation. In such case, the solvent remains with the residual piperazine following the fractional distillation, and this glycol solution of piperazine is then filtered above 70° C. to remove precipitated sodium chloride (or other alkali or alkaline earth metal chloride resulting from the neutralization) and the purified glycol solution of piperazine is then ready such as for reuse or recycle in the process.

The followng example illustrates the practice of this invention.

*Example 1*

350 grams (3.96 mols) of 97.5% purity piperazine were dissolved in 520 grams of methanol. This solution was placed in an autoclave and 57 grams (1.13 mols) of methyl chloride were added. The reaction vessel was sealed and rocked for 2.6 hours at 103–108° C. During the reaction period the pressure decreased from 46 to 40 p.s.i.g. (pound per square inch gauge). On completion of the reaction, the contents of the reaction vessel were stirred with 46 grams (1.15 mols) of sodium hydroxide and 700 grams of ethylene glycol. The reaction product was then distilled through a packed column. Methanol was first recovered overhead followed by a 21 gram fraction boiling in the range of 70–101° C. This cut consisted of about 69% water, the balance being the by-product 1,4-dimethylpiperazine. A second fraction was obtained boiling in the range 101–146° C. This fraction consisted of a minor amount of water, 102 grams of 1-methylpiperazine and 30 grams of piperazine. Most of the 1-methyl-piperazine was collected in the relatively narrow range of 135–137° C. This cut was then redistilled to separate the 1-methylpiperazine. The yield of 1-methylpiperazine (mols of 1-methylpiperazine produced÷mols of methyl chloride charged×100) amounted to 90%. The residual glycol solution was filtered while above 70° C. to remove sodium chloride and was then ready for reuse in the process.

In a second run conducted under the conditions set forth above, ethylene glycol was employed as the solvent during the reaction. This avoided the necessity for solvent distillation prior to product recovery, and it was unnecessary to add glycol prior to the fractional distillation.

The method of isolation of 1-methylpiperazine from a mixture of the same with 1,4-dimethylpiperazine by removing a water azeotrope of 1,4-dimethylpiperazine followed by recovery of the 1-methylpiperazine is also a feature of the present invention.

Obviously many modifications and variations of the invention, as hereinbefore set forth, may be made without departing from the spirit and scope thereof, and therefore only such limitations should be imposed as are indicated to the appended claims.

I claim:

1. A method for preparing 1-methylpiperazine which comprises reacting piperazine with methyl chloride, the mol ratio of said piperazine to said methyl chloride being 2:1 to 6:1, at a temperature in the range of 80–200° C. in a closed reaction zone under a pressure from about 20 to 80 pounds per square inch gauge for a period of about 1 to 3 hours effective for substantially complete consumption of the methyl chloride and recovering 1-methylpiperazine as the predominant reaction product in a yield approaching 90 mol percent based on the methyl chloride charged.

2. In the reaction of piperazine with methyl chloride by heating a molar excess of piperazine with methyl chloride under pressure at a temperature of about 80–200° C. with the production of a reaction mixture containing 1-methylpiperazine, 1,4-dimethylpiperazine and unreacted piperazine, the method of isolating 1-methylpiperazine from the reaction mixture which comprises fractionally distilling the reaction mixture in the presence of water to remove overhead a water azeotrope of the 1,4-dimethylpiperazine containing substantially all of the 1,4-dimethylpiperazine together with most of the water, then continuing the distillation to remove overhead a cut containing the 1-methylpiperazine together with a minor amount of piperazine and any remaining water, and recovering 1-methylpiperazine from said cut by redistillation.

3. In the reaction of piperazine with methyl chloride by heating said reactants under pressure at a temperature of about 80–200° C. with the formation of a reaction mixture containing as reaction products 1-methylpiperazine and 1,4-dimethylpiperazine, the method of producing and isolating 1-methylpiperazine in high yield which comprises charging to the reaction about 2–6 mols of piperazine for each mol of methyl chloride, and reacting for a time effective for substantially complete consumption of the methyl chloride, neutralizing the resulting reaction mixture with an aqueous alkaline solution, fractionally distilling the neutralized reaction mixture to remove overhead a water azeotrope of the 1,4-dimethylpiperazine containing substantially all of the 1,4-dimethylpiperazine together with most of the water, and then separating by distillation from the residue and isolating 1-methylpiperazine in a yield of the order of around 90 mol percent based on the methyl chloride charged.

4. The method according to claim 3, wherein the reaction is carried out in the presence of a solvent selected from the group consisting of ethylene glycol and diethylene glycol.

5. A process for preparing 1-methylpiperazine which comprises adding piperazine to ethylene glycol to form a solution, charging methyl chloride to said solution, the mol ratio of said piperazine to said methyl chloride charged being in the range of 2:1 to 6:1, reacting said piperazine and said methyl chloride by heating said mixture at a temperature in the range of 80 to 200° C. and under a pressure of about 20–80 pounds per square inch gauge for a time of about 1–3 hours effective for substantially complete consumption of methyl chloride, neutralizing the resulting reaction mixture with an aqueous alkaline solution, distilling the neutralized reaction mixture to remove overhead as a first fraction an azeotrope of water and 1,4-dimethylpiperazine containing substantially all of the 1,4-dimethylpiperazine together with most of the water, containing the distillation to remove overhead a second fraction containing 1-methylpiperazine substantially free of 1,4-dimethylpiperazine to leave a residual solvent solution containing unreacted piperazine and ethylene glycol, filtering said residual solvent solution at a temperature above 70° C. to provide a refined solvent solution of piperazine in ethylene glycol, and returning said refined solvent solution for further reaction in said process.

References Cited in the file of this patent

UNITED STATES PATENTS 2,415,787   Buck et al. _____ Feb. 11, 1947

OTHER REFERENCES

Baltzly et al.: Jour. Amer. Chem. Soc., vol. 66, pages 263–266 (1944).

Stromholm: Berichte Deutsche Chemische Gesellschaft, vol. 36, pages 143–144 (1903).